(12) United States Patent
Sperna Weiland

(10) Patent No.: US 6,357,630 B1
(45) Date of Patent: *Mar. 19, 2002

(54) ASSEMBLY COMPRISING A FLEXIBLE CONTAINER HAVING A DOSING DEVICE AND DOSING DEVICE OF SUCH ASSEMBLY

(75) Inventor: Jan Adolf Ernst Sperna Weiland, Deventer (NL)

(73) Assignee: Sara Lee/DE N.V., Utrecht (NL)

( * ) Notice: Subject to any disclaimer, the term of this patent is extended or adjusted under 35 U.S.C. 154(b) by 0 days.

This patent is subject to a terminal disclaimer.

(21) Appl. No.: 09/463,901

(22) PCT Filed: Jul. 31, 1998

(86) PCT No.: PCT/NL98/00443

§ 371 Date: Apr. 4, 2000

§ 102(e) Date: Apr. 4, 2000

(87) PCT Pub. No.: WO99/06802

PCT Pub. Date: Feb. 11, 1999

(30) Foreign Application Priority Data

Aug. 1, 1997 (NL) .............................................. 1006707
Sep. 12, 1997 (NL) .............................................. 1007030
Jul. 3, 1998 (NL) .............................................. 1009549

(51) Int. Cl.$^7$ .............................................. B67D 37/00
(52) U.S. Cl. ...................................... 222/207; 222/211
(58) Field of Search ............................... 222/205, 207, 222/211, 215

(56) References Cited

U.S. PATENT DOCUMENTS

| | | | | |
|---|---|---|---|---|
| 1,859,833 A | * | 5/1932 | Manley | .......................... 222/2 |
| 3,246,807 A | * | 4/1966 | Micallef | ...................... 222/207 |
| 4,143,794 A | * | 3/1979 | Stratford et al. | ......... 222/207 X |
| 4,747,521 A | * | 5/1988 | Saffron | ......................... 222/205 |
| 4,830,226 A | * | 5/1989 | Kong | ........................... 222/205 |
| 5,259,536 A | * | 11/1993 | Reyman | ...................... 222/207 |
| 5,363,991 A | * | 11/1994 | Reyman | ...................... 222/207 |
| 5,392,966 A | * | 2/1995 | Bunin | .......................... 222/454 |
| 5,833,124 A | * | 11/1998 | Groves et al. | .......... 222/205 X |
| 5,868,285 A | * | 2/1999 | Boyte, Sr. | .................... 222/212 |
| 6,186,367 B1 | * | 2/2001 | Harrold | ...................... 222/205 |

FOREIGN PATENT DOCUMENTS

| | | |
|---|---|---|
| DE | 1 075 967 | 2/1960 |
| DE | 27 52 669 | 5/1979 |
| DE | 39 40 534 | 6/1991 |
| DE | 43 05 390 | 1/1994 |
| EP | 0 087 016 | 8/1983 |
| EP | 0 335 505 A1 | * 10/1989 |
| GB | 0 183 217 A | 6/1987 |
| WO | WO 96/03625 | 2/1996 |

* cited by examiner

Primary Examiner—Kenneth Bomberg
(74) Attorney, Agent, or Firm—Merchant & Gould P.C.

(57) ABSTRACT

Assembly comprising a flexible container having an inner space in which liquid can be stored and a dosing device connected to the container. The dosing device comprises a filling chamber and at least one feed line system extending into the filling chamber. The feed line system comprises an outflow opening located in the filling chamber, so that the filling chamber can be filled with the liquid from the container by squeezing the chamber. The dosing device further comprises a mechanism for setting the filling height of the filling chamber.

18 Claims, 8 Drawing Sheets

ASSEMBLY COMPRISING A FLEXIBLE CONTAINER HAVING A DOSING DEVICE AND DOSING DEVICE OF SUCH ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A "MICROFICHE APPENDIX"

Not Applicable

BACKGROUND OF THE INVENTION

The invention relates to an assembly comprising a flexible container having an inner space in which liquid can be stored and a dosing device connected to the container for dispensing liquid from the container in a dosed manner, the dosing device comprising a filling chamber and at least one feed line system extending from the inner space of the container into the filling chamber, the feed line system comprising an inflow opening located in the inner space of the container and at least one outflow opening located in the filling chamber, enabling the filling chamber to be filled with the liquid from the container by squeezing the container, the filling chamber comprising a filling chamber bottom and at least one vertical sidewall which in combination bound an inner space of the filling chamber and the dosing device further comprising means for setting the filling height of the filling chamber.

The invention also relates to a dosing device of such assembly.

Such assembly is known inter alia from international patent application 9603625. The container can be filled with an antifreeze for windscreen wipers and other liquids intended to be dispensed in accurately predetermined quantities. In use, the flexible container is squeezed for this purpose. This will cause the filling chamber to be filled via a feed line system. When the squeezing of the container is subsequently ended, the container will return into its original shape again, while liquid will be sucked back from the filling chamber into the inner space of the container. However, when the liquid level in the filling chamber has dropped to the outflow opening of the feed line system, the feed line system will draw in air rather than liquid. Consequently, the filling chamber will be filled to a height corresponding to the height of the outflow opening of the feed line system. Next, the assembly can be placed upside down to cause the liquid to flow from the filling chamber. In this manner, a dosed quantity of liquid is dispensed.

For setting the filling height of the filling chamber, the feed line system of the known assembly is built up from two tubes which are telescopically interconnected. By moving an upper one of the two tubes up and down relative to the lower one, the height of the outflow opening of the upper tube can be set relative to a bottom of the filling chamber in a stepless fashion. Thus, the filling height of the filling chamber can be set in a stepless fashion.

A drawback of the known assembly is that setting the filling height by manually moving the upper line up and down relative to the lower line involves a great inaccuracy. Moreover, the setting operation often proceeds rather stiffly and jerkily, so that it takes relatively much time and effort to set the filling height in an accurate manner.

BRIEF SUMMARY OF THE INVENTION

It is an object of the invention to overcome the above drawback and the invention is characterized in that the dosing device further comprises a base bottom connected to the container, the filling chamber bottom being mounted on the base bottom for displacement or translation relative to the base bottom, and that the feed line system comprises at least two separate pieces of line extending upwards from the filling chamber bottom, while the inflow opening can selectively be brought into fluid connection with one of the pieces of line by displacement or rotation of the filling chamber relative to the base bottom, an outflow opening of a first piece of line of the at least two pieces of line being located at a first height relative to the filling chamber bottom when the first piece of line is connected to the inflow opening and an outflow opening of a second piece of line of the at least two pieces of line being located at a second height relative to the filling chamber bottom when the second piece of line is connected to the inflow opening, and the first and second heights differing from each other.

As in accordance with the invention, the first and second heights are directly determined by the two pieces of line, the user knows precisely which quantifies of liquid will be dispensed in a dosed manner. In particular, the device comprises a large number of pieces of line which each have an outflow opening that, when the relevant piece of line is connected to the inflow opening, is located at a predetermined height relative to the filling chamber. In this manner, through selection of a piece of line, a corresponding, discrete quantity of liquid to be dispensed in a dosed manner can be set. Each piece of line can correspond to a predetermined quantity of liquid. The inaccuracy of the dosing device may be better than 1 per mille. As the pieces of line are separate from each other, the pieces of line and the filling chamber bottom can readily be manufactured from one piece by means of injection molding. The space of the filling chamber which, in use, is filled with liquid is determined by the vertical sidewall of the filling chamber. An advantage of the separate pieces of line is that they occupy relatively little space and that, in use, they are being flowed around entirely by the liquid. This means that a relatively large part of the inner space of the filling chamber can be filled with liquid.

In particular, the pieces of line have mutually different lengths and the outflow opening of the piece of line is located at an upper free end of the piece of line. This enables the entire piece of line to be properly aerated during the emptying of the piece of line, as a result of which little or not rest liquid stays behind. This prevents blockages. Preferably, the pieces of line are each of straight design and at least substantially vertically directed.

In particular, it further applies that the filling chamber has its top side provided with a top wall in which an outlet opening is provided. This construction has as an advantage that the entire filling chamber comprises no parts which move relative to each other and which are interconnected via a liquid seal. This prevents leakage. This also applies when the filling chamber empties via the outlet opening or is closed off by a closing cap.

A further drawback of the known device is that when the filling chamber is being filled by squeezing the container, there is the risk of the container being squeezed too long and too hard, as a consequence of which the filling chamber flows over. By squeezing the bottle too hard, an undesired quantity of liquid is dispensed by the filling chamber.

In accordance with another aspect of the invention, a solution to this drawback is provided as well. To that end, the assembly is provided with an outlet opening for dispensing liquid stored in the inner space and with closing means which close off the outlet opening when the filling height of the filling chamber exceeds a predetermined maximum value.

Accordingly, when the container is squeezed too hard, so that the filling chamber threatens to flow over, the closing means effect that the outlet opening is closed off. To this end, the closing means in particular comprise a floating element, the floating element being moved upwards by the liquid in the filling chamber when the filling height of the filling chamber exceeds the predetermined maximum value.

In accordance with a preferred embodiment, the floating element is of ball-shaped design and the floating element is located in the filling chamber, the outlet opening being provided at a top side of the filling chamber and the floating element closing off the outlet opening on an inside of the filling chamber when the filling height of the filling chamber exceeds the predetermined maximum value.

BRIEF DESCRIPTION OF THE SEVERAL VIEWS OF THE DRAWINGS

The invention will now be specified with reference to the accompanying drawings. In these drawings:

FIG. 10b shows a longitudinal section of the floating element according to FIG. 10a;

FIG. 10c is a bottom view of the floating element according to FIG. 10a; and

FIG. 10d is a top plan view of the floating element according to FIG. 10a.

DETAILED DESCRIPTION OF THE INVENTION

Figure 2:
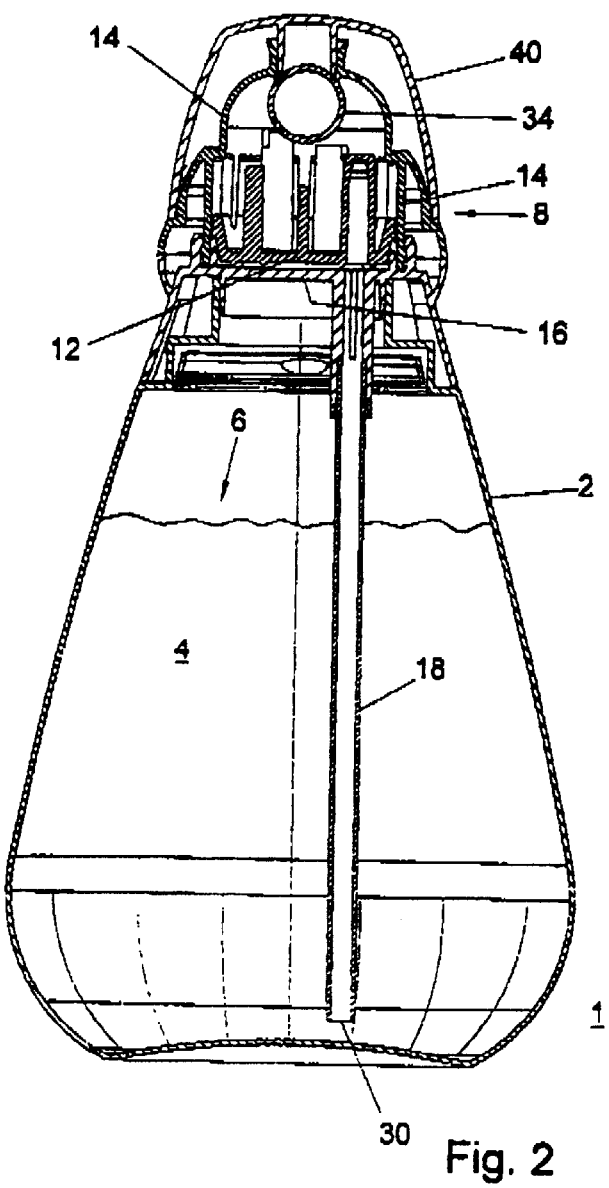
FIG. 2 shows a cross section taken on the line A—A of FIG. 1.

The assembly 1 according to FIGS. 1–6 comprises a flexible container 2 having an inner space 4 in which liquid 6 can be stored. The assembly further comprises a dosing device a for dispensing the liquid 6 from the container 2 in a dosed manner. The dosing device 8 is provided with a filling chamber 10 comprising a filling chamber bottom 12 and a vertical sidewall 14. The filling chamber bottom 12 is rotatably mounted on a base bottom 16 which is fixedly connected to the container 2. Via a feed line system, the filling chamber 10 is in fluid connection with the inner space 4 of the container 2. In the example, the feed line system consists of a base line 18 extending from the inner space 4 of the container 2 to a through-flow opening 20 in the base bottom 16. The feed line system further comprises a number of pieces of line 22.i (i=1, 2, 3, 4, 5) which are separate from each other and are each mechanically connected to the filling chamber bottom 12.

The filling chamber 10 has its top side provided with a top wall 24 in which an outlet opening 26 is provided. The top wall 24 is fixedly connected to the vertical sidewall 14 of the filling chamber. The filling chamber is further provided with an outer wall 28 extending downwards from the top wall 20 and outwards in radial direction. In use, the outer wall 28 can be gripped for rotating the filling chamber, including the pieces of line 22.ic relative to the base bottom 16 for selecting one of the pieces of line 22.i.

The pieces of line 22.i are connected to the filling chamber bottom 12 in such position that each piece of line 22.i can selectively be brought into fluid connection with the base line 18 by a rotation of the filling chamber bottom 12. Hence, the base line 18 comprises an inflow opening 30 which can selectively be brought into fluid connection with one of the outflow openings 32.i (i=1, 2, 3, 4, 5) of the respective pieces of line 22.i.

In this example, the pieces of line 22.i each have a different length. Moreover, the pieces of line are of straight design and are each at least substantially vertically directed. Further, it applies that the outflow openings are arranged adjacent an upper free end of the pieces of line. The above implies that the outflow openings 32.i always have mutually different heights relative to the bottom 12 of the filling chamber 10. In other words, to a first piece of line 22.i and a second piece of line 22.j, wherein i is unequal to j, it applies that the outflow opening of the first piece of line 18.i is located at a first height relative to the bottom 12 of the filling chamber 10 when the first piece of line is connected to the inflow opening 30, and an outflow opening 32.j of the second piece of line 22.j is located at a second height relative to the bottom 12 of the filling chamber 10 when the second piece of line 22.j is connected to the inflow opening 30, the first and the second height differing from each other.

Figure 6:
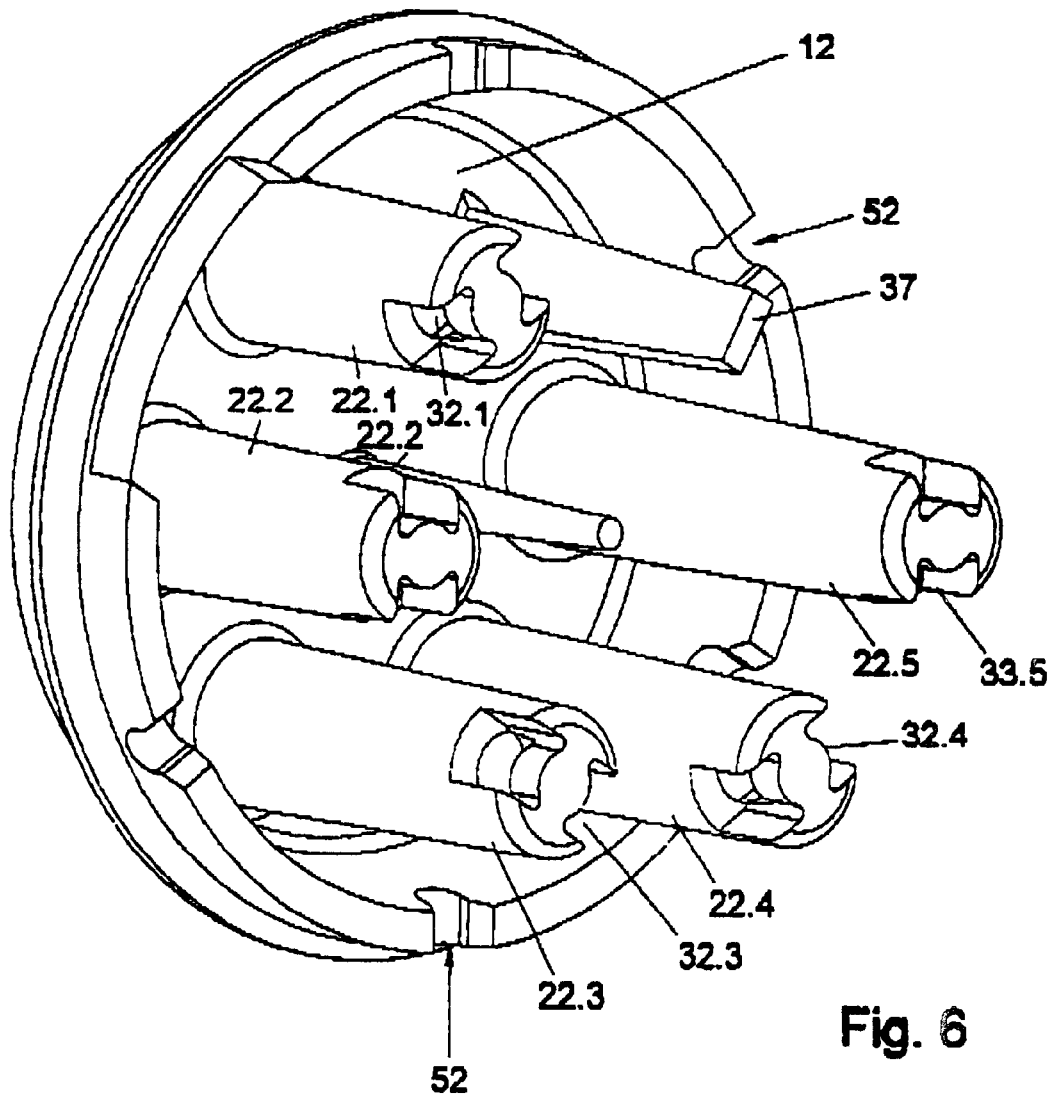
FIG. 6 shows, in perspective, a part of the dosing device of the assembly according to FIG. 1.

In use, the inner space 4 is aerated only via the feed line system. The filing chamber bottom 12 can further be manipulated into a rotational position such that none of the pieces of line 22.i is connected to the inflow opening 30, i.e. to the base line 18. This is the case when through rotation of the filling chamber bottom, a vertical leg 37 connected to the filling chamber bottom 12 is manipulated into a position above the base line 18 (see FIG. 6 where the filling chamber bottom 12 with the pieces of line 22.i are shown). Via a snap connection, the part shown in FIG. 6 is connected to the vertical sidewall 14.

The device further comprises closing means closing the outlet opening 26 when the maximum filling height of the chamber is exceeded. To this end, the closing means comprise a floating element 34 which, in this example, is of ball-shaped design. The floating element is located in the filling chamber 10 under the outlet opening 26.

The operation of the device is as follows. A user first selects one of the pieces of line 22.i for filling the filling chamber 10 by rotating the filling chamber 10 relative to the base bottom 16. With this, the filling height of the filling chamber 10 is set at the same time. By setting the filling height of the filling chamber 10, the quantify of liquid is determined which is eventually dispensed by the assembly. After for instance the piece of line 22.3 has been manipulated into a position above the piece of base line 16 through rotation of the filling chamber bottom, a user squeezes the flexible container 2. Now, a liquid flow path from the inner space 4 to the filling chamber 10 extends from the inflow opening 30, through the base line 16 and the piece of line 22.3 to the outflow opening 32.3 of the piece of line 22.3. Liquid will now flow from the inner space 4 into the filling chamber 10 via the base line 16 and the piece of line 22.3. A user squeezes the container 2 such that an excess of liquid is introduced into the filling chamber 10. The liquid level 36 is then at a height above the outflow opening 30.3 of the piece of line 22.3. When after the filling of the filling chamber 10, a user subsequently stops squeezing the container 2, the container 2 will be apt to return into its original condition again. Consequently, the container 2 starts to suck liquid from the filling chamber 10 back into the inner space 4 of the container 2 via the base line 16 and the piece of line 22.3. Accordingly, the liquid level 36', i.e. the height of the liquid level relative to the bottom 12, starts to drop. However, when the liquid level 36' has dropped to the outflow opening 32.3, no further liquid will flow back from the filling chamber into the inner space 4 of the container 2. Instead, the container will further be filled with air via the outflow opening 32.3. The liquid level 36 is then exactly flush with the outflow opening 32.3. In this manner, the height of the outflow opening 32.3 determines the quantity of liquid that eventually stays behind in the filling chamber 10 after a user has squeezed the flexible container 2 and subsequently allowed it to expand again.

Next, a user can place the assembly upside down, enabling the filling chamber 10 to drain via the outlet opening 36, so that hence a predetermined quantity of liquid is dispensed by the assembly in a dosed manner.

When a user subsequently wishes to dispense a different quantity of liquid, he can select another piece of line 22.i corresponding to said quantity. In this example, it applies that for an increasing value of i, a larger quantity of liquid is dosed. An the height of the pieces of line 22.i is accurately predetermined, a user knows precisely which quantity of liquid will be dispensed by the assembly.

When, for whatever reason, a user squeezes the container 2 particularly powerfully, the filling chamber 10 is filled particularly quickly. This would involve the risk of the filling chamber flowing over via the outlet opening 26. However, this will not happen, because in that case, the liquid level 36 will cause the floating element 34 to move upwards. Eventually, the floating element 34 will close off the outlet opening 26, as shown in FIG. 2. When the floating element 34 closes off the outlet opening 26, liquid cannot be squeezed from the outlet opening 26. Moreover, the liquid level of the filling chamber 10 cannot be filled any further, because in the filling chamber 10 and, accordingly, in the inner space 4, a pressure is created which opposes the further impression of the flexible container 2. In this example, an annular edge 38, closed in itself, is provided on the inside of the filling chamber, around the outlet opening 26. This annular edge 38 on the one hand provides a proper closure with the floating element 34. On the other hand, the edge 38 provides that the floating element 34 does not stick to the outlet opening 26 when the bottle is released and the liquid flows partially back again from the filling chamber 10 to the inner space 4 of the container 2. The floating element 34 will then move down relative to the edge 38 under its weight and floating on the dropping liquid level 36, causing the outlet opening 36 to be cleared again.

In this example, the floating element 34 therefore constitutes a closing means in which the floating element is moved upwards by the liquid in the filling chamber when the filling height of the filling chamber exceeds a predetermined maximum value. In this example, said predetermined maximum value is partially determined by the dimensions of the floating element.

In this example, the dosing device further comprises a removable closing cap 40. The closing cap 40 is detachably connected to the sidewall 14.

Figure 1:
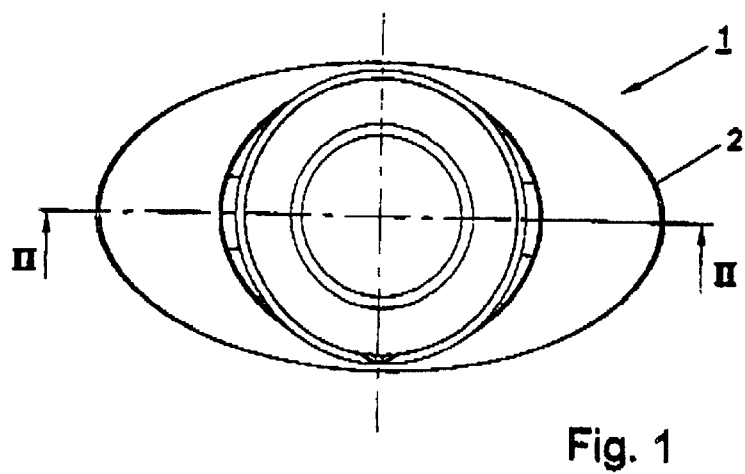
FIG. 1 is a top plan view of a possible embodiment of an assembly according to the invention.
Figure 3:
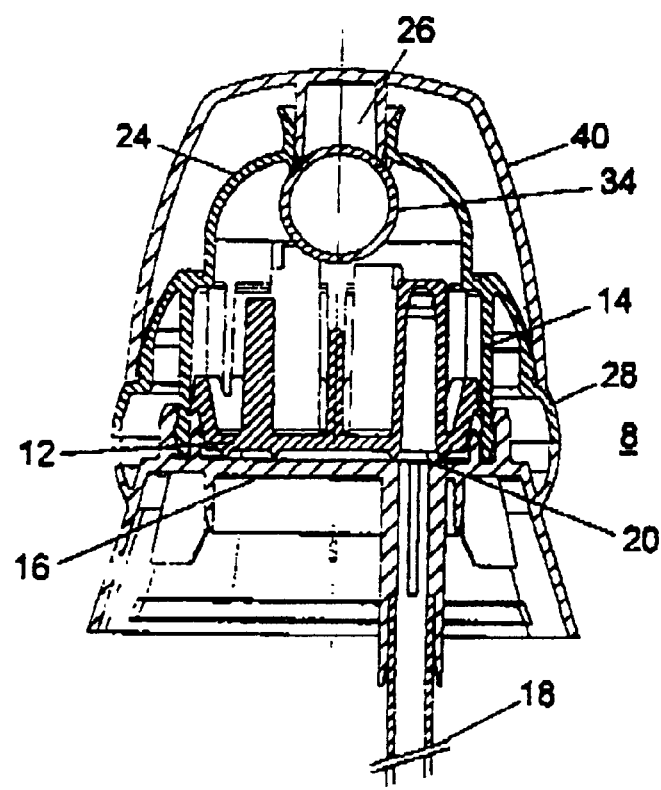
FIG. 3 shows a cross section of the dosing device of the assembly according to FIG. 1, taken on the line A—A of FIG. 1.
Figure 4:
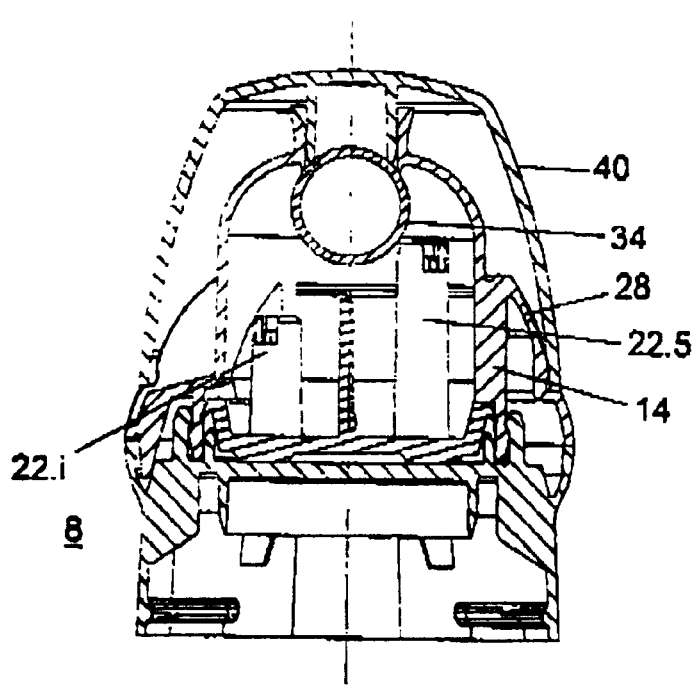
FIG. 4 shows a cross section of the dosing device according to FIG. 3, taken on the line B—B of FIG. 1.
Figure 5:
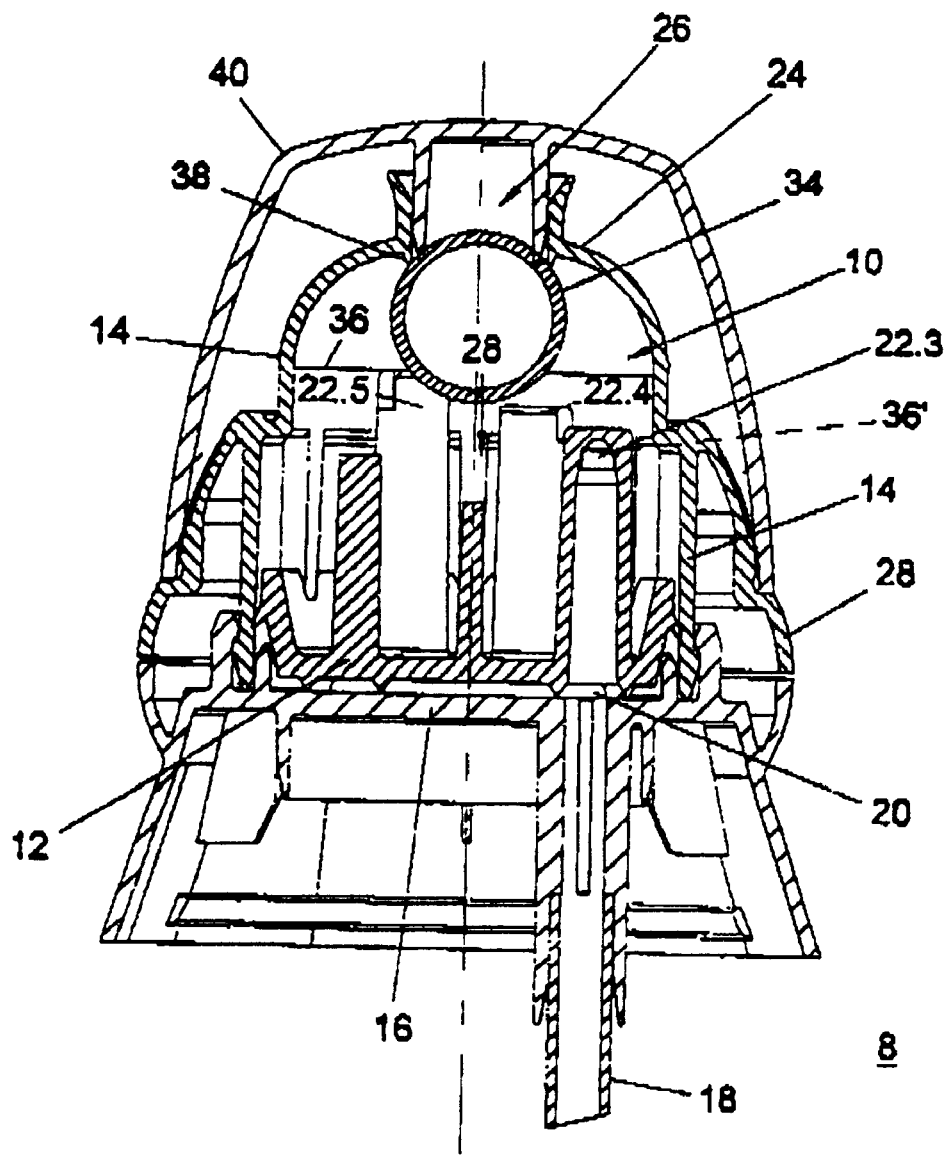
FIG. 5 shows a part of FIG. 3.
Figure 7:
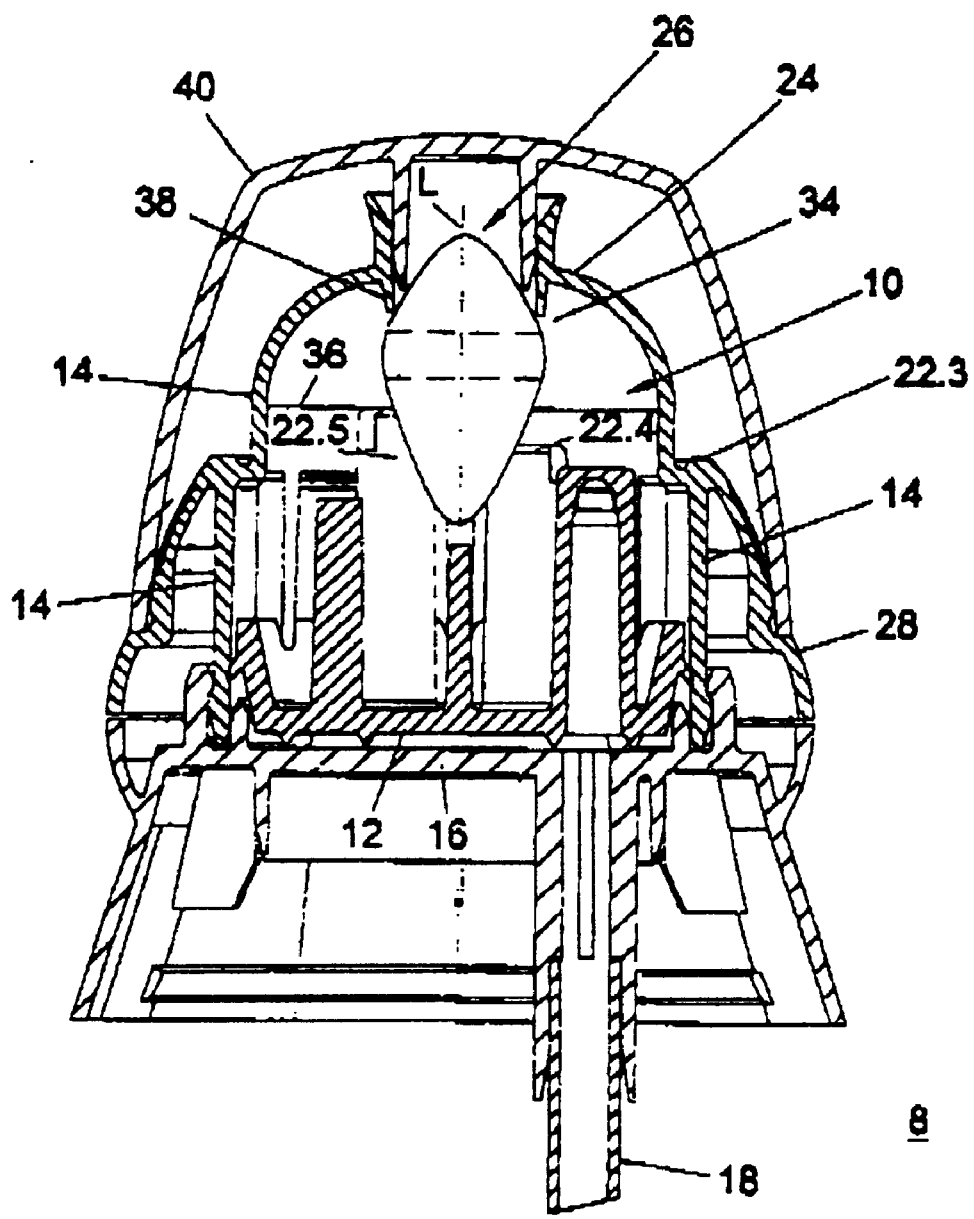
FIG. 7 shows a cross section taken on the line A—A of FIG. 1, the device comprising an alternative floating element.
Figure 8A:
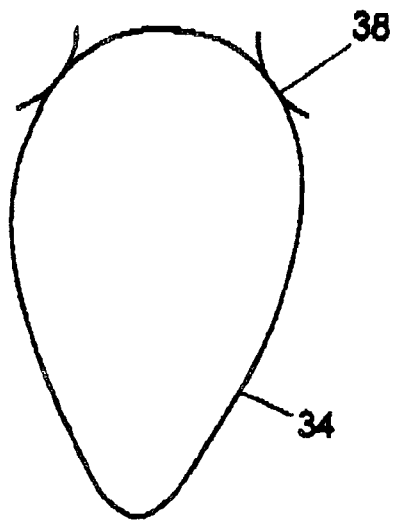
FIG. 8a shows the floating element of the device according to FIG. 7.

FIG. 7 shows the device according to FIG. 1, in which, however, the device is provided with an alternative embodiment of a floating element. This floating element is shown in detail in FIG. 8a.

In this example, the floating element 34 is of elongated design. A longitudinal axis 1 of the floating element 34 is at least substantially vertically directed. Also, the floating element tapers at its top side as well as at its bottom side. Here, the floating element extends into the outlet opening 26 in its extreme upper position as well as in its extreme lower position. It also applies that in this example, the floating element has its bottom side extending between at least two of the pieces of line in each of the positions mentioned. Hence, the floating element can move up and down in vertical direction under the influence of the liquid level, while, however, it is not possible that the floating element slides away or falls laterally. This is effected in that the top side of the floating element extends into the outlet opening, while the bottom side of the floating element extends at least between two of the pieces of line.

In this embodiment, too, the annular edge 38 provides a proper closure. On the other hand, the edge again provides that the floating element does not stick to the outlet opening 26.

Figure 8B:
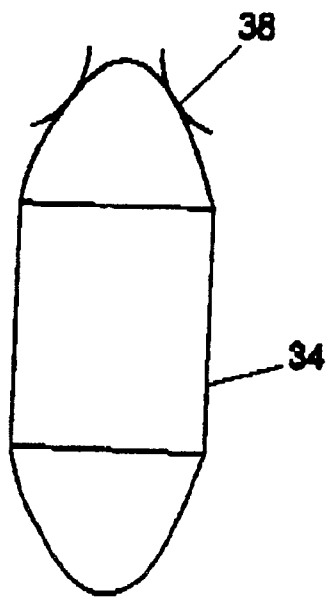
FIGS. 8b–8d show alternative embodiments of floating elements of the device according to FIG. 1.
Figure 8C:
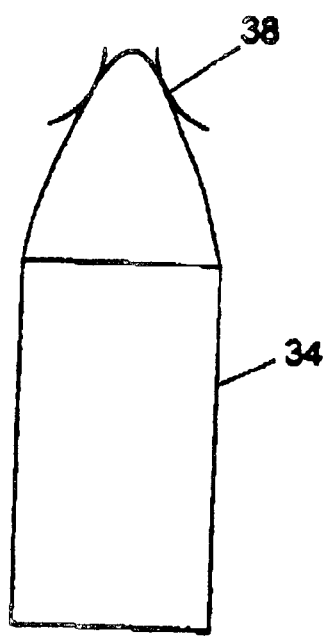
Figure 8D:
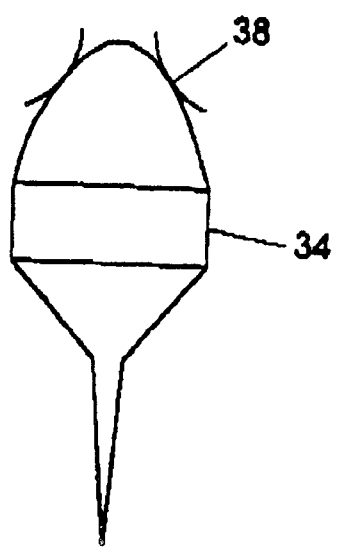

Other forms of the floating element are also conceivable, as for instance shown in the examples of FIGS. 8b–8d. Although the floating element of FIG. 8a has less buoyancy than the floating element of FIG. 8b, the floating element of FIG. 8a proves to have a better behavior in the case of pouring out. This is effected in that the bottom side of the floating element of FIG. 8a tapers less than the top side of the floating element of FIG. 8a.

Figure 9:
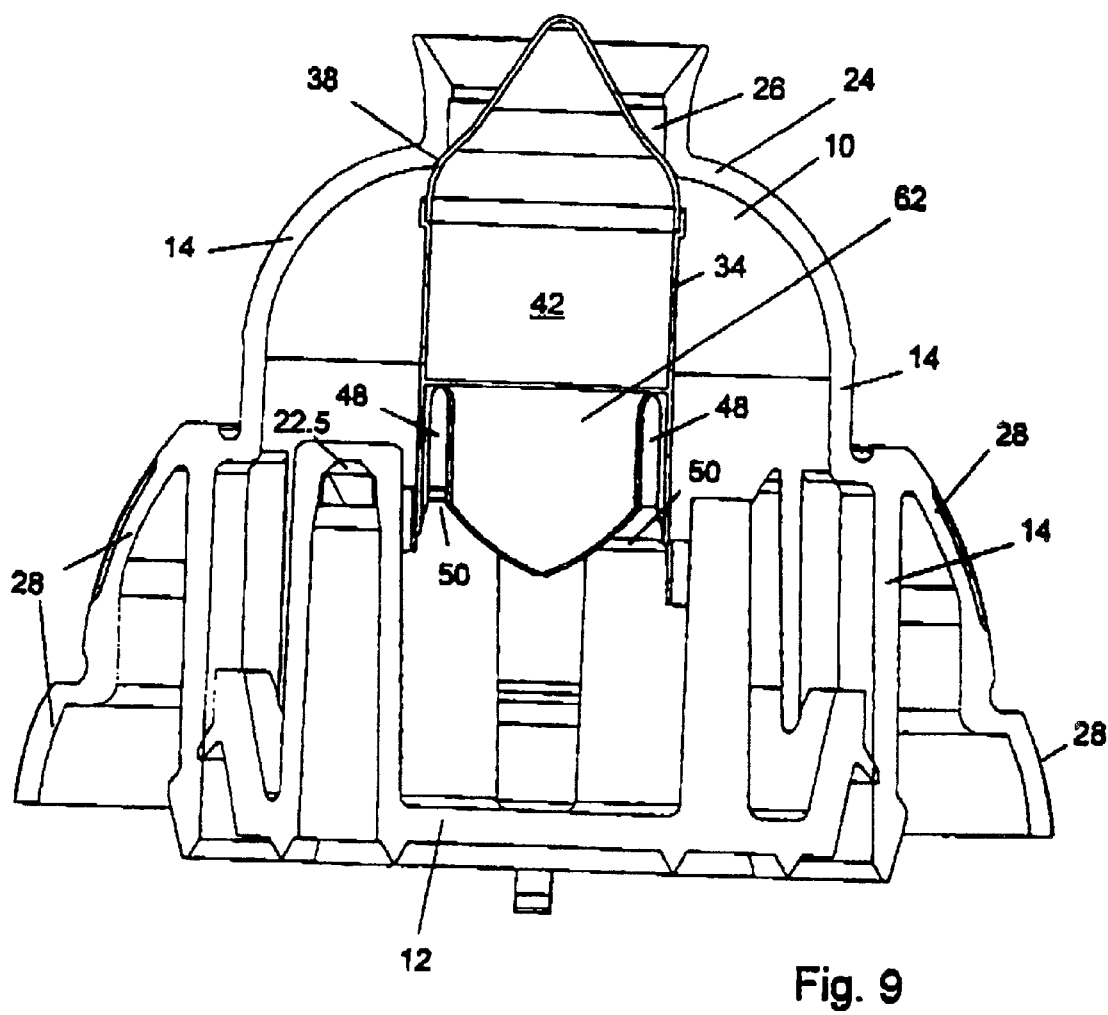
FIG. 9 shows a cross section of a possible embodiment of the assembly according to the invention with a particular embodiment of a floating element of the assembly.
Figure 10A:
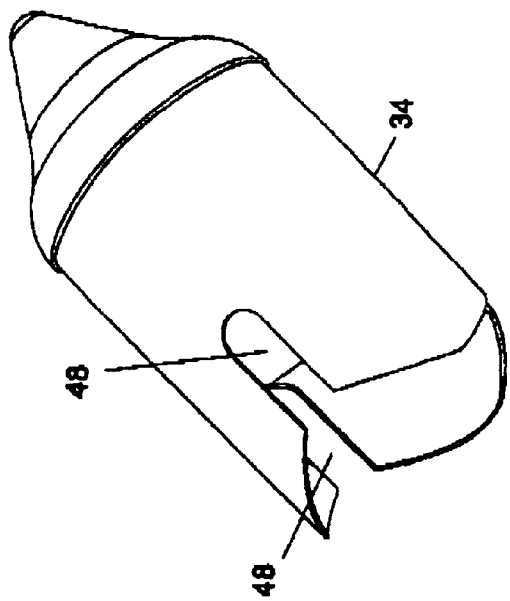
FIG. 10a shows, in perspective, the floating element according to FIG. 9.
Figure 10B:
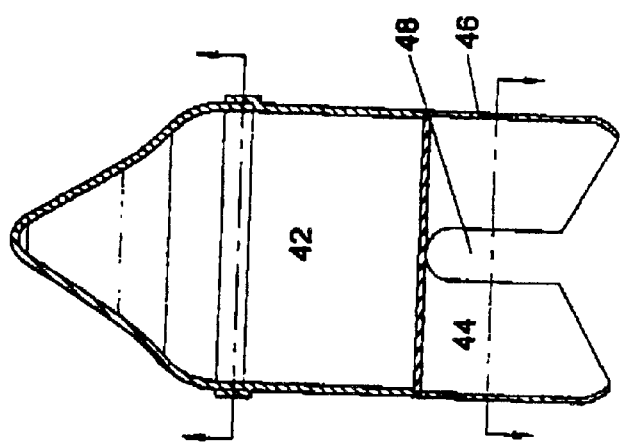
Figure 10D:
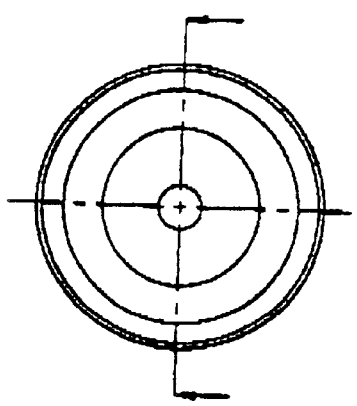
Figure 10C:
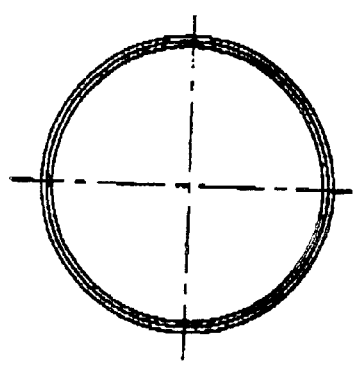

The floating element 34 as shown in FIGS. 9 and 10 likewise tapers at its top side. An upper portion of the floating element comprises a liquid-tight chamber 40. A lower portion of the floating element comprises a chamber 44 with is open at its bottom side. The chamber 44 is as it were formed by a cylindrical surface 46. Provided in this surface are two slots 48 extending upwards from the bottom side of the floating element. These slots cooperate with vertical walls 50 in the filling chamber 10. The arrangement is such that these vertical walls at least partially extend into the slots. This enables the floating element to move up and down in the filling chamber 10, with slots and walls acting as a guide for the floating element. Such variants are each understood to fall within the framework of the invention.

The invention is by no means limited to the embodiments outlined hereinabove. For instance, more or fewer pieces of line 22.i can be used. The pieces of line 22.i need not especially be of straight design and the longitudinal directions of the pieces of line need not be vertically directed, either. Hence, it is also possible that the pieces of line comprise a bend. In this example, the outflow openings of the pieces of line are located at an upper free end of the pieces of line. However, it is also possible that the outflow openings are located in a sidewall of the pieces of line.

It is also possible that the filling chamber bottom is displaceably, rather than rotatably, connected to the base bottom 16. In that case, the pieces of line are selected by a translating rather than a rotating movement for being brought into fluid connection with the base line 16. Further, the device may comprise snap means 52 which provide that the filling chamber bottom 12 has a number of click positions relative to the base bottom 16, which positions correspond to the rotational positions to which the base line 18 is connected to the respective pieces of line 22.i.

Preferably, the diameter of the base line 18 increases in a direction from top to bottom (see also FIG. 2). This has the advantage that the tube cannot easily become clogged, also when highly viscous liquids are dosed.

Such variants are each understood to fall within the framework of the invention.

What is claimed is:

1. A liquid dispensing assembly comprising
    a flexible container defining an inner space therein adapted to store liquid;
    a dosing device connected to the container and adapted for dispensing liquid from the container, the dosing device comprising
        a base bottom connected to the container;
        a filling chamber comprising a filling chamber bottom and a vertical sidewall connected to the filling chamber bottom;
        at least one feed line system adapted to fluidly connect the inner space of the container the filling chamber, the feed line system comprising
            an inflow opening defined in the inner space of the container; and
            at least two pieces of line mounted on the filling chamber bottom, each piece of line defining an outflow opening located into the filling chamber, each of the at least two pieces of line being adapted to individually and exclusively fluidly communicate with the inflow opening such that each outflow opening is adapted to individually and exclusively fluidly communicate with the inflow opening; wherein
    the filling chamber bottom is movably mounted on and substantially in contact with the base bottom so that the filling chamber is movable relative to the base bottom, such that the inflow opening may be individually and exclusively brought into fluid communication with a selected outflow opening selected from the outflow openings defined by the at least two pieces of line by a movement of the filling chamber relative to the base bottom;
    a squeezing of the flexible container causes liquid to flow from the inner space of the container through the inflow opening, through the selected outflow opening, and into the filling chamber;
    a first outflow opening of the at least two outflow openings is located at a first height relative to the filling chamber bottom and a second outflow opening of the at least two outflow openings is located at a second height relative to the filling chamber bottom, the first and second heights differing from each other; and
    when the squeezing of the flexible container is sufficient to fill the filling chamber with liquid to a height greater than a height of the selected outflow opening, liquid drains out of the filling chamber through the outflow opening, through the inflow opening and into the flexible container until the filling chamber is filled to the height of the selected outflow opening.

2. An assembly according to claim 1, wherein each of the at least two pieces of line have different heights.

3. An assembly according to claim 1, wherein the pieces of line are at least substantially straight and are at least substantially vertical.

4. An assembly according to claim 1, wherein the filling chamber is rotatable to a position such that none of the outflow openings are in fluid communication with the inflow communication, so that the container is not in fluid communication with the filling chamber.

5. An assembly according to claim 1, wherein the filling chamber defines an outlet opening for dispensing liquid from the filling chamber, and further comprises closing means for closing off the outlet opening when the filling chamber fills with liquid to a height that exceeds a predetermined maximum height.

6. An assembly according to claim 5, wherein the closing means comprise a floating element, the floating element being adapted to float in liquid such that the floating element closes off the outlet opening when the filling chamber fills with liquid to the height that exceeds the predetermined maximum value.

7. An assembly according to claim 6, wherein the floating element is ball-shaped and is disposed within the filling chamber, and the outlet opening is defined in a top side of the filling chamber.

8. An assembly according to claim 7, wherein the filling chamber further comprises an annular edge around the outlet opening, the annular edge being adapted to cooperate with the floating body to close off the outlet opening.

9. An assembly according to claim 6, wherein the floating element is elongated and defines a longitudinal axis therethrough, the longitudinal axis of the floating element being at least substantially, and the outlet opening is defined in a top side of the filling chamber.

10. An assembly according to claim 8, wherein the floating element comprises a top side, and tapers on the top side.

11. An assembly according to claim 9, wherein the top side of the floating element extends into the outlet opening.

12. An assembly according to claim 9, wherein the floating element comprises a bottom side, and tapers on the bottom side.

13. An assembly according to claim 12, wherein the bottom side of the floating element extends between at least two of the at least two pieces of line.

14. An assembly according to claim 6, wherein the filling chamber comprises a top wall, the top wall comprising a top side of the filling chamber, and the outlet opening being defined through the top wall.

15. An assembly according to claim 1, wherein the filling chamber comprises a top wall, the top wall defining an outlet opening for dispensing liquid from the filling chamber.

16. An assembly according to claim 1, wherein the filling chamber bottom is rotatably mounted on and substantially in contact with the base bottom.

17. An assembly according to claim 16, wherein the filling chamber is rotatable about an axis perpendicular to the base bottom.

18. An assembly according to claim 1, wherein the filling chamber bottom is translatably mounted on and substantially in contact with the base bottom.

\* \* \* \* \*